United States Patent
Miyoshi et al.

(10) Patent No.: US 11,582,062 B2
(45) Date of Patent: Feb. 14, 2023

(54) RELAY DEVICE

(71) Applicant: DENSO CORPORATION, Kariya (JP)

(72) Inventors: Hisashi Miyoshi, Kariya (JP); Tomohisa Kishigami, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/510,491

(22) Filed: Oct. 26, 2021

(65) Prior Publication Data
US 2022/0141051 A1 May 5, 2022

(30) Foreign Application Priority Data
Oct. 29, 2020 (JP) .............................. JP2020-181680

(51) Int. Cl.
*H04L 12/40* (2006.01)
*H04B 3/36* (2006.01)
*H04L 12/46* (2006.01)

(52) U.S. Cl.
CPC ......... *H04L 12/40039* (2013.01); *H04B 3/36* (2013.01); *H04L 12/40032* (2013.01); *H04L 12/40071* (2013.01)

(58) Field of Classification Search
CPC ............... H04L 12/40; H04L 12/40006; H04L 12/40032; H04L 12/40039; H04L 12/40052; H04L 12/40071; H04B 3/36
See application file for complete search history.

(56) References Cited

U.S. PATENT DOCUMENTS

| 5,913,042 | A  | * | 6/1999 | Shemla ................... H04L 49/90 370/429 |
| 7,583,600 | B1 | * | 9/2009 | Schanke ................ H04L 1/1854 370/235 |
| 7,933,980 | B2 | * | 4/2011 | Bowser ............... H04L 41/0879 714/34 |
| 2002/0009094 | A1 | * | 1/2002 | Medina ............. G06F 15/17375 370/386 |
| 2009/0080462 | A1 | * | 3/2009 | Mueller .................. H04L 47/30 370/476 |
| 2010/0189129 | A1 | * | 7/2010 | Hinosugi ................ H04L 47/10 370/468 |
| 2013/0326255 | A1 |   | 12/2013 | Kodama et al. |
| 2014/0241370 | A1 |   | 8/2014 | Itou et al. |

(Continued)

*Primary Examiner* — Jenee Holland
(74) *Attorney, Agent, or Firm* — Posz Law Group, PLC

(57) ABSTRACT

A relay device relays a management frame between nodes connected to mutually different communication buses. The relay device includes (i) communicator units provided respectively to correspond to the communication buses, and (ii) communication controller units provided respectively to correspond to the communicator units. The communication controller unit respectively includes a corresponding transmission buffer configured to store the management frame, which is to be transmitted from the communicator unit corresponding to the communication controller unit. In response to determining that the management frame is retained in the transmission buffer corresponding to the communication controller unit, the communication controller unit transmits the management frame, which is received at a present time and stored in the transmission buffer, from the communicator unit corresponding to the communication controller unit.

8 Claims, 11 Drawing Sheets

(56) References Cited

U.S. PATENT DOCUMENTS

| | | | |
|---|---|---|---|
| 2016/0217822 A1* | 7/2016 | Jung | G11B 20/1803 |
| 2016/0274913 A1* | 9/2016 | Gainey, Jr. | G06F 9/30101 |
| 2016/0380895 A1* | 12/2016 | Xiong | H04L 41/00 |
| | | | 370/231 |
| 2017/0278482 A1* | 9/2017 | Purushothaman | G09G 5/14 |
| 2017/0289847 A1* | 10/2017 | Wetterwald | H04W 52/0203 |
| 2018/0077731 A1* | 3/2018 | Ghosh | H04L 5/0053 |
| 2018/0101708 A1* | 4/2018 | Gao | G06K 7/1093 |
| 2019/0004808 A1* | 1/2019 | Larson | G06F 9/3851 |
| 2019/0086971 A1* | 3/2019 | Sanders | G06F 1/1694 |
| 2020/0037041 A1* | 1/2020 | Tajiri | H04N 21/658 |
| 2020/0092796 A1* | 3/2020 | Baek | H04W 8/005 |
| 2020/0186470 A1* | 6/2020 | Yamamoto | H04L 45/745 |
| 2021/0344610 A1* | 11/2021 | Lesartre | H04L 47/621 |

* cited by examiner

RELAY DEVICE

CROSS REFERENCE TO RELATED APPLICATION

The present application is based on Japanese Patent Application No. 2020-181680 filed on Oct. 29, 2020, the disclosure of which is incorporated herein by reference.

TECHNICAL FIELD

The present disclosure relates to a relay device.

BACKGROUND

There is disclosed a relay device provided between a plurality of communication buses. The relay device relays the communication frame between the nodes connected to each communication bus. The relay device receives an activation signal from the first network via the first receiver, and gives the received activation signal to the input side of the second transmitter via the first connection line. This activation signal is transmitted to the second network via the second transmitter.

SUMMARY

According to an example of the present disclosure, a relay device is provided to relay a management frame between nodes connected to mutually different communication buses. The relay device includes (i) communicator units provided respectively to correspond to the communication buses, and (ii) communication controller units provided respectively to correspond to the communicator units. The communication controller unit respectively includes a corresponding transmission buffer configured to store the management frame, which is to be transmitted from the communicator unit corresponding to the communication controller unit. In response to determining that the management frame is retained in the transmission buffer corresponding to the communication controller unit, the communication controller unit transmits the management frame, which is received at a present time and stored in the transmission buffer, from the communicator unit corresponding to the communication controller unit.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Figure 1:
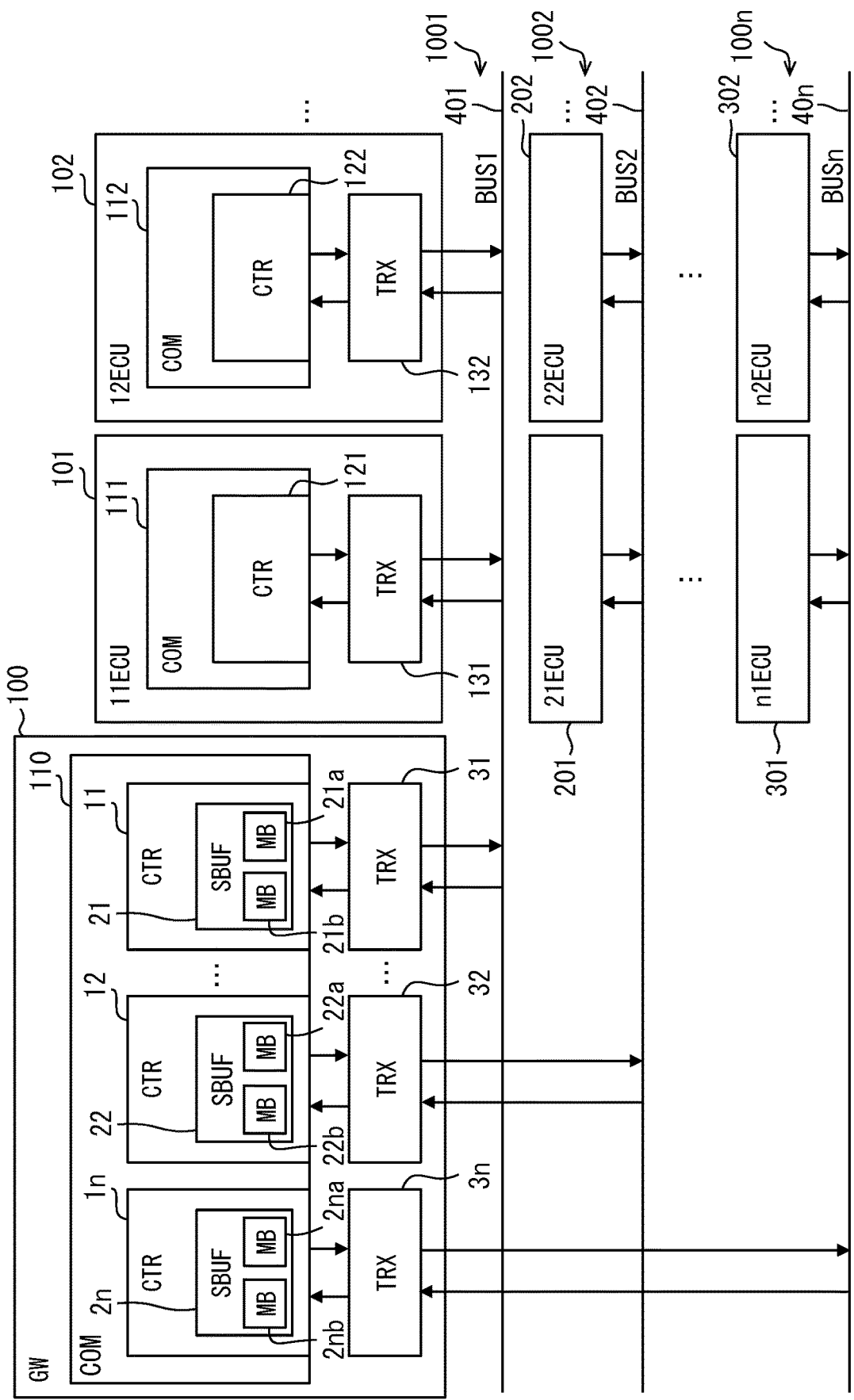
FIG. 1 is a block diagram showing a schematic configuration of an in-vehicle network according to a first embodiment.

Hereinafter, a plurality of embodiments for carrying out the present disclosure will be described with reference to the drawings. In each embodiment, elements corresponding to those described in the preceding embodiment are denoted by the same reference numerals, and redundant descriptions will be omitted in some cases. In each of the embodiments, when only a part of the configuration is explained, the other part of the configuration can be referred to the other embodiment explained previously and applied.

First Embodiment

The following will describe a relay device 100 according to a first embodiment of the present disclosure with reference to FIGS. 1 to 6. The relay device 100 is configured to be mounted on a vehicle, for example.

(Configuration)

Constituent elements of an in-vehicle network will be described with reference to FIGS. 1 and 6. The in-vehicle network includes a relay device 100 and a plurality of networks 1001 to 100n. The relay device 100 is connected to a plurality of networks 1001 to 100n. In other words, the relay device 100 is connected to communication buses 401 to 40n of the networks 1001 to 100n. Each network 1001 to 100n is a bus network.

The present embodiment employs an example in which three networks 1001, 1002, 100n are connected to the relay device 100. However, in the present disclosure, at least two networks need be connected to the relay device 100.

(Network Configuration)

A first network 1001 includes a first communication bus 401 (BUS 1) and ECUs 101 to 104 as nodes. "ECU" signifies electronic control unit. The first communication bus 401 is connected to the relay device 100. The ECUs 101 to 104 are connected to the first communication bus 401. Therefore, the ECUs 101 to 104 are connected to the relay device 100 via the first communication bus 401.

Figure 6:
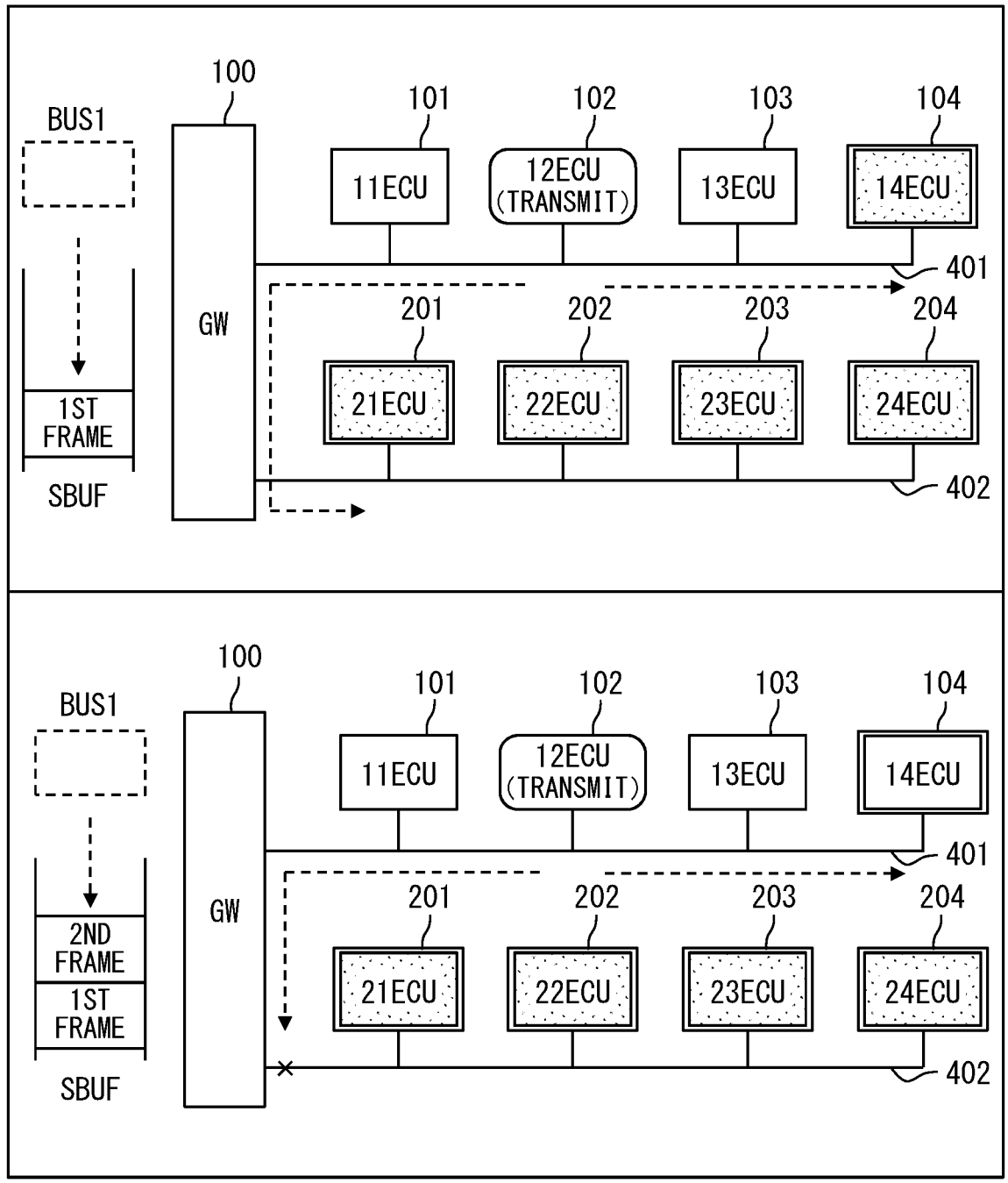
FIG. 6 is an image diagram showing a flow of NM frames according to the first embodiment.

Note that FIG. 6 shows ECUs 101 to 104. However, in FIG. 1, only ECUs 101 and 102 are shown. Further, in FIGS. 1 and 6, each ECU 101 to 104 is shown as 11 ECU, 12 ECU, 13 ECU, and 14 ECU.

A second network 1002 includes a second communication bus 402 (BUS 2) and ECUs 201 to 204 as nodes. The second communication bus 402 is connected to the relay device 100. ECUs 201 to 204 are connected to the second communication bus 402. Therefore, the ECUs 201 to 204 are connected to the relay device 100 via the second communication bus 402.

Note that FIG. 6 illustrates ECUs 201 to 204. However, in FIG. 1, only ECUs 201 and 202 are shown. Further, in FIGS. 1 and 6, each ECU 201 to 204 is shown as 21 ECU, 22 ECU, 23 ECU, and 24 ECU.

The nth network 100n includes an nth communication bus 40n (BUS n) and ECUs 301 and 302 as nodes. The nth communication bus 40n is connected to the relay device 100. The ECUs 301 and 302 are connected to the nth communication bus 40n. Therefore, the ECUs 301 and 302 are connected to the relay device 100 via the nth communication bus 40n. Further, in FIGS. 1 and 6, the ECUs 301 and 302 are shown as n1 ECU and n2 ECU, respectively. The ECUs 101 to 104, 201 to 204, 301 and 302 are also simply referred to as ECUs when it is not necessary to distinguish them.

Each communication bus 401 to 40n is a bus of an in-vehicle network compliant with the CAN protocol. The communication bus may also be referred to as a CAN bus. CAN is an abbreviation for Controller Area Network. CAN is a registered trademark.

The ECUs 101 to 104 are configured to be able to communicate communication frames with each other via the first communication bus 401. Similarly, the ECUs 201 to 204 are configured to be able to communicate communication frames with each other via the second communication bus 402. The ECUs 301 and 302 are configured to be able to communicate communication frames with each other via the nth communication bus 40n. Further, an ECU connected to one of the communication buses 401 to 40n is configured to be able to communicate communication frames with another ECU connected to the remaining one of the communication buses 401 to 40n via the relay device 100. In this way, each ECU has a function of performing communication conforming to the CAN protocol.

Further, the present embodiment employs an ECU that supports partial networking. Partial networking is a function that selectively causes each ECU to wake up or to sleep. Partial networking is a function that causes only some ECUs to wake up or to sleep. This partial networking can employ, for example, a mechanism conforming to the ISO 11898-2: 2016 standard. The present embodiment employs an example in which a part of the sleeping ECU is selectively waked up.

In partial networking, a plurality of ECUs are grouped. In addition, a management frame is used as a communication frame. The management frame can also be said to be a network management frame (NM frame). The network management is a function of managing whether the ECUs on the communication buses 401 to 40n are caused to enter or depart from the network. The present embodiment employs an example in which the ECU is grouped into groups G1 to G11. The communication frame also includes a non-NM frame different from the NM frame. The non-NM frame is a control frame in which control data is stored in a data area. A non-NM frame corresponds to a non-management frame.

Figure 5:
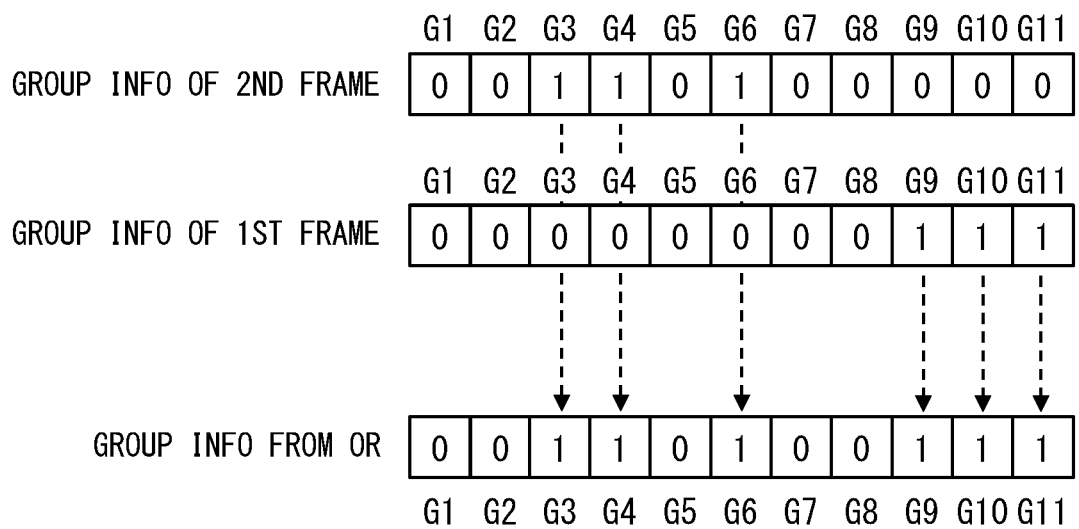
FIG. 5 is an image diagram showing an avoidance processing operation of the relay device according to the first embodiment.

Here, the NM frame will be described with reference to FIG. 5. FIG. 5 shows a data area of the NM frame stored in the transmission buffer 21 described later. In this way, the NM frame stores group information in the data area. One bit is assigned to each group G1 to G11 in the data area. The bits in the data area are allocated in the order of groups G1 to G11 from the left.

The group information is information (data) indicating a wake-up instruction or a sleep instruction to each group G1 to G11. The NM frame indicating the wake-up instruction to each group G1 to G11 is also referred to as a wake-up frame. The NM frame indicating the sleep instruction to each group G1 to G11 is also referred to as a sleep frame. In the present embodiment, a wake-up frame is adopted as an example of the NM frame.

In the wake-up frame, 1 of the group information indicates a wake-up instruction. On the other hand, in the sleep frame, 1 of the group information indicates a sleep instruction. For example, in FIG. 5, in the wake-up frame, the first frame has group information indicating a wake-up instruction for groups G9 to G11. Further, in FIG. 5, in the sleep frame, the first frame has group information indicating sleep instructions for the groups G9 to G11.

This information can also be said to be an identifier indicating a wake-up instruction or a sleep instruction to each group G1 to G11. It can also be said that the NM frame contains data indicating "Selective wake-up/sleep". Further, the NM frame can be said to be a communication frame that selectively causes a node to activate or a communication frame that selectively causes a node to sleep (i.e., be standby), based on the identifier.

The information indicating the wake-up instruction can be said to be data indicating entry into the network. On the other hand, the information indicating the sleep instruction can be said to be data indicating departure from the network. Therefore, it can be said that the NM frame includes a plurality of data indicating entry into the network and departure from the network, for each ECU. In addition, entering the network can be rephrased as waking up the ECU. Departing from the network can be rephrased as putting the ECU to sleep or be standby.

In this way, the NM frame can be said to be a communication frame that manages the entry of each ECU into the network and the departure of each ECU from the network. Further, the NM frame can be said to be a communication frame for managing a network including data indicating state transitions of each ECU. Therefore, the NM frame is less important than the control frame.

The group information of the first frame is the group information recorded in the data area of the NM frame stored in the transmission buffer 21. The group information of the second frame is the group information recorded in the data area of the NM frame received after the first frame. Therefore, it can be said that the second frame is the present NM frame or the subsequent NM frame. Then, the group information resulting from OR (i.e., logical sum) is the group information generated in order to avoid the retention. This point will be described in detail later.

The above group information is only an example. The present disclosure can employ any group information as long as including information indicating a wake-up instruction or a sleep instruction to each group G1 to G11.

Each ECU differs in the connected sensor and the in-vehicle device to be controlled. Further, each ECU executes a different program. Therefore, each ECU has a different control content (processing content). However, each ECU has similar constituent elements. In the present embodiment, the ECU 101 and the ECU 102 will be used as typical examples.

The present disclosure employs an example in which the ECU 101 transmits an NM frame. The present disclosure employs an example in which one of the ECUs that receive the NM frame is the ECU 201. The NM frame will be described in detail later. The ECU 101 includes an ECU side computation unit 111, and an ECU side transceiver 131 (TRX). The ECU side computation unit 111 is a microcomputer. The ECU side computation unit 111 includes at least one CPU (Central Processing Unit), at least one storage device, an ECU side controller 121 (CTR), and a bus connecting these. Further, the ECU 101 includes interfaces connected to a sensor and an in-vehicle device. The transceiver can also be said to be a communication transceiver or a CAN transceiver. The controller can also be said to be a communication controller or a CAN controller.

The storage device includes a non-volatile semiconductor storage device and a volatile semiconductor storage device. Programs and the like are stored in the non-volatile semiconductor storage device. The volatile semiconductor storage device stores data acquired from a sensor or the like, data acquired from an ECU side controller 121, or the like.

The CPU executes the program. By executing the program, the CPU performs computation processing using data stored in the volatile semiconductor storage device. The CPU outputs data (calculation result) that is the result of calculation processing to an in-vehicle device. In this way, the ECU controls the in-vehicle device. Further, the CPU may transmit the calculation result to the first communication bus 401 via the ECU side controller 121 and the ECU side transceiver 131.

The in-vehicle device is connected to the ECU without going through the communication buses 401 to 40n. This point is common to the CPU of each ECU.

The ECU side controller 121 transmits and receives communication frames via the first communication bus 401. The ECU side controller 121 executes communication control according to the CAN protocol. The ECU side controller 121 executes transmission control, reception control, and arbitration control as examples of communication control.

The ECU side transceiver 131 is electrically connected to the ECU side controller 121 and is also electrically connected to the first communication bus 401. The ECU side transceiver 131 converts the electrical characteristics reciprocally between the first communication bus 401 and the ECU side controller 121. As a result, the communication frame can be transmitted in both directions between the first communication bus 401 and the ECU side controller 121.

For example, by converting the bus level signal of the first communication bus 401 into a digital signal that can be handled by the ECU side controller 121, dominant and recessive can be recognized. That is, the ECU side controller 121 is connected to the first communication bus 401 via the ECU side transceiver 131, so that communication frames can be transmitted to and received from the first communication bus 401.

The ECU side controller 121 has a buffer for storing a communication frame. The ECU side controller 121 has a transmission buffer and a reception buffer. The ECU side controller 121 sequentially stores messages (data) for transmission in the transmission buffer. The ECU side controller 121 transmits the stored message according to the priority of the ID code. The ECU side controller 121 generates a frame based on the message stored in the transmission buffer, and transmits the frame to the first communication bus 401 via the ECU side transceiver 131.

The ECU side controller 121 receives a frame from the first communication bus 401 via the ECU side transceiver 131, extracts a message or the like, and sequentially stores the message or the like in the reception buffer. The ECU side controller 121 outputs the received message to the transmission target according to the priority of the ID code. The ECU side controller 121 mediates transmission rights (bit-wise non-destructive arbitration) when frames collide on the first communication bus 401. The ECU side controller 121 also detects and reports an error that occurs in connection with the transmission/reception of the frame. A buffer can also be called a message box.

The ECU 101 has a normal mode and a power saving mode that saves more power than the normal mode, as operating states. The normal mode is a wake-up state or activated state. The power saving mode is a sleep state. Further, the power saving mode may include a standby state in which power consumption is larger than that in the sleep state, in addition to the sleep state. The sleep state can also be said to be a sleep mode. Similarly, the standby state can be said to be the standby mode.

In the normal mode, the ECU side computation unit 111 performs arithmetic processing, transmission control, reception control, arbitration control, and the like. In addition, the ECU side transceiver 131 can transmit and receive communication frames via the first communication bus 401. It can be said that the ECU 101 enters the network in the normal mode.

In the power saving mode, the ECU side computation unit 111 does not perform computation processing, transmission control, reception control, arbitration control, or the like. It can be said that, in the power saving mode, the ECU 101 is departing from or leaves the network.

The ECU 101 changes the operating state based on the group information of the received NM frame. That is, the ECU 101 determines the operating state depending on whether the information for the group to which it belongs in the group information is the information indicating the wake-up instruction or the information indicating the sleep instruction. Then, when the operating state transitions according to the NM frame, the ECU 101 transmits an ACK response indicating the transition. Like the ECU 101, the ECU 102 includes an ECU side computation unit 112, an ECU side controller 122, and an ECU side transceiver 132.

(Configuration of Relay Device)

The relay device 100, which may also be referred to as a gateway (GW) includes a relay side computation unit 110, and a relay side transceiver 31 to 3n (TRX). The relay device 100 is connected to a plurality of networks 1001 to 100n respectively having corresponding communication buses 401 to 40n to which at least one ECU is connected. Then, the relay device 100 relays the communication frame between the ECUs connected to the different communication buses 401 to 40n. That is, the relay device 100 can be said to be a device that relays communication frames received from each network 1001 to 100n.

The relay side computation unit 110 is a microcomputer. The relay side computation unit 110 includes at least one CPU, at least one storage device, each relay side controller 11 to 1n (CTR), and a bus connecting these. The CPU of the relay side computation unit 110 executes a program to execute computation processing in the same manner as the CPU of the ECU. The configuration of the storage device is the same as that of the storage device of the ECU.

Each relay side controller 11 to 1n may also be referred to as a communication controller unit. Each relay side controller 11 to 1n is provided corresponding to each relay side transceiver 31 to 3n. That is, each relay side controller 11 to 1n and each relay side transceiver 31 to 3n are provided in a couple.

Specifically, the relay side controller 11 is provided corresponding to the relay side transceiver 31. The relay side controller 12 is provided corresponding to the relay side transceiver 32. The relay side controller 1n is provided corresponding to the relay side transceiver 3n.

Each relay side controller 11 to 1n controls communication with each corresponding relay side transceiver 31 to 3n. That is, each of the relay side controllers 11 to 1n executes transmission control, reception control, and arbitration control in the same manner as the ECU side controller 121.

The relay side controller 11 includes a transmission buffer 21 (SBUF) that stores communication frames such as NM frames to be transmitted. Further, the transmission buffer 21 includes a first buffer 21a and a second buffer 21b. The first buffer 21a and the second buffer 21b are provided independently. The first buffer 21a is an area for storing NM frames. The second buffer 21b is an area for storing non-NM frames.

Similarly, the relay side controller 12 includes a transmission buffer 22 for storing NM frames to be transmitted. The transmission buffer 22 includes a first buffer 22a for storing NM frames and a second buffer 22b for storing non-NM frames. Further, the relay side controller 1n includes a transmission buffer 2n for storing NM frames to be transmitted. The transmission buffer 2n includes a first buffer 2na that stores NM frames and a second buffer 2nb that stores non-NM frames. The first buffers 21a to 2na each correspond to a first area. The second buffers 21b to 2nb each correspond to a second area.

The relay side computation unit 110 relays the NM frame received by each relay side controller 11 to 1n to other ECUs. Therefore, the relay side computation unit 110 stores the NM frames received by the relay side controllers 11 to 1n via the relay side transceivers 31 to 3n in the transmission buffers 21 to 2n. More specifically, the relay side computation unit 110 stores the NM frames received by one of the relay side controllers 11 to 1n in the transmission buffers 21 to 2n in the other of the relay side controllers 11 to 1n. For example, the relay side computation unit 110 stores the NM frame received by the relay side controller 11 in the transmission buffers 22 and 2n. Each relay side controller 12, 1n transmits an NM frame stored in its own transmission buffers 22 and 2n.

Further, each relay side controller 11 to 1n waits for an ACK response from each ECU when transmitting the NM frame stored in the transmission buffers 21 to 2n. When receiving the ACK response, each relay side controller 11 to 1n erase the NM frame stored in the transmission buffers 21 to 2n.

Each relay side transceiver 31 to 3n may also be referred to as a communicator unit. The relay side transceivers 31 to 3n are respectively provided to the corresponding communication buses 401 to 40n. That is, each relay side transceiver 31 to 3n and each communication bus 401 to 40n are provided to have a one to one correspondence.

Specifically, the relay side transceiver 31 is electrically connected to the relay side controller 11 and also electrically connected to the first communication bus 401. The relay side transceiver 31 converts the electrical characteristics reciprocally between the first communication bus 401 and the relay side controller 11. As a result, the communication frame can be transmitted in both directions between the first communication bus 401 and the relay side controller 11. Similarly, the relay side transceiver 32 is electrically connected to the relay side controller 12 and also electrically connected to the second communication bus 402. The relay side transceiver 3n is electrically connected to the relay side controller 1n and is also electrically connected to the nth communication bus 40n.

Each relay side transceiver 31 to 3n receives a communication frame via the corresponding communication bus 401 to 40n, and transmits a communication frame to the ECU via the corresponding communication bus 401 to 40n. Therefore, each relay side transceiver 31 to 3n transmits/receives an NM frame.

Further, the relay device 100 transmits the communication frame, which is received by one of the relay side transceivers 31 to 3n, via the remaining of the relay side transceivers 31 to 3n. The relay device 100 transmits, for example, the communication frame, which is received by the relay side transceiver 31, via the other relay side transceivers 32 and 3n. That is, the relay device 100 transmits the communication frame, which is received via the first communication bus 401, to the second communication bus 402 and the nth communication bus 40n. In other words, when the relay device 100 receives the communication frame transmitted from the ECU 102 of the first network 1001, the relay device 100 transmits the received communication frame to the second network 1002. In this way, the relay device 100 relays communication frames between different networks.

The present embodiment employs the relay device 100 including three relay side controllers 11 to 1n and three relay side transceivers 31 to 3n. However, the present disclosure can employ the relay device 100 as long as including at least the same number of relay side controllers and relay side transceivers as the number of the networks.

It is noted that the relay device 100, the relay side controller 11 to 1n, the ECU 101 to 104, 201 to 204, 301 to 302, the ECU side computation unit 111, 112, the ECU side controller 121, 122, and methods thereof described in the present disclosure may be implemented by a special purpose computer.

Such a special purpose computer may be implemented
(i) by configuring (a) a memory and a processor programmed to execute one or more particular functions embodied in computer programs, or
(ii) by configuring (b) a processor provided by one or more special purpose hardware logic circuits, or
(iii) by configuring a combination of (a) a memory and a processor programmed to execute one or more particular functions embodied in computer programs and (b) a processor provided by one or more special purpose hardware logic circuits.

The computer programs may be stored, as instructions to be executed by a computer, in a tangible non-transitory computer-readable storage medium.

(Processing Operation, Effect)

Here, the processing operations of the relay device 100 and the ECUs 102 and 201, and the effects of the relay device 100 will be described with reference to FIGS. 2 to 6. Here, in order to simplify the description, only the first network 1001 and the second network 1002 will be described.

FIG. 6 shows the flow of the NM frame via the relay device 100. More specifically, the upper part of FIG. 6 shows the flow of the NM frame in the state where the NM frame is not retained. The lower part of FIG. 6 shows the flow of the NM frame in the state where the NM frame is retained. The broken line arrow in FIG. 6 indicates the transmission path of the communication frame.

FIG. 6 illustrates an example in which the ECUs 101 and 103 are included in the group G1, further, the ECUs 104 and 201 to 204 are included in the group G2. The ECU 102 is not included in the groups G1 and G2.

Further, in the example of FIG. 6, the ECU 102 transmits a first frame, which is an NM frame, including information indicating a wake-up instruction to the ECUs 101 and 103 belonging to the group G1. After that, the ECU 102 transmits a second frame, which is an NM frame, including information indicating a wake-up instruction to the ECUs 104, 201 to 204 belonging to the group G2. Hereinafter, this NM frame is also referred to as a wake-up frame. Then, FIG. 6 employs the situation where the ECU 101, the ECUs 103 to 104, and the ECUs 201 to 204 are in the sleep state and the ECU 102 transmits the wakeup frame. Since the first frame is transmitted prior to the second frame, it can be said to be a preceding frame. On the contrary, the second frame can be said to be a succeeding frame.

Figure 2:
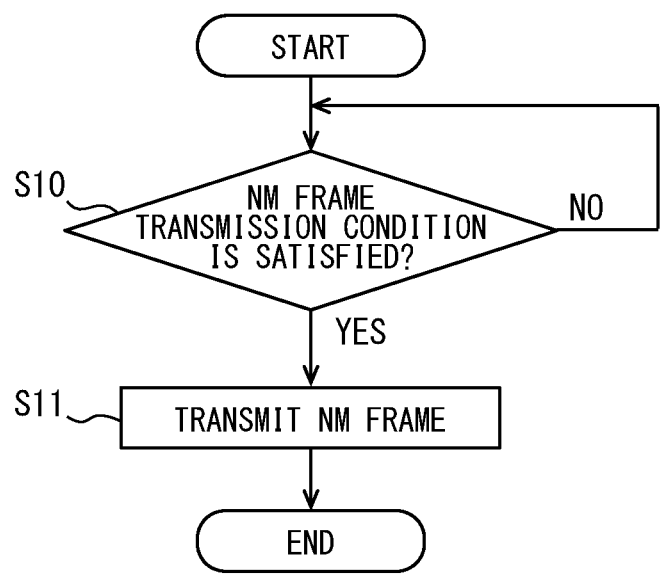
FIG. 2 is a flowchart showing a transmission processing operation of an ECU according to the first embodiment.

First, the processing operation of the ECU 102 that transmits the NM frame will be described with reference to FIG. 2. The ECU 102 executes the flowchart of FIG. 2 even when transmitting an NM frame including information indicating a sleep instruction to a certain group of ECUs. Further, the ECU 102 executes the flowchart of FIG. 2 even when it does not support partial networking.

In step S10, it is determined whether or not the NM frame transmission condition is satisfied. When determining that the NM frame transmission condition is satisfied, the ECU side computation unit 112 proceeds to step S11. When not determining that the NM frame transmission condition is satisfied, the ECU side computation unit 112 repeats step S10. Suppose cases where (i) a certain period of time has passed since the power is turned on, (ii) a specific signal from the sensor is detected, and (iii) a specific frame from the relay device 100 is received. Under such cases, the ECU side computation unit 112 determines that the NM frame transmission condition is satisfied.

In step S11, the NM frame is transmitted. As shown in the upper part of FIG. 6, the ECU side computation unit 112 transmits an NM frame via the ECU side controller 122 and the ECU side transceiver 132. In the present embodiment, the ECU side computation unit 112 transmits a wake-up frame as an NM frame. The wake-up frame is first transmitted to the first communication bus 401. Then, the ECUs 101 and 103 receive the wake-up frame and wake up. However, since the ECU 104 is in the group G2, it does not wake up.

Figure 3:
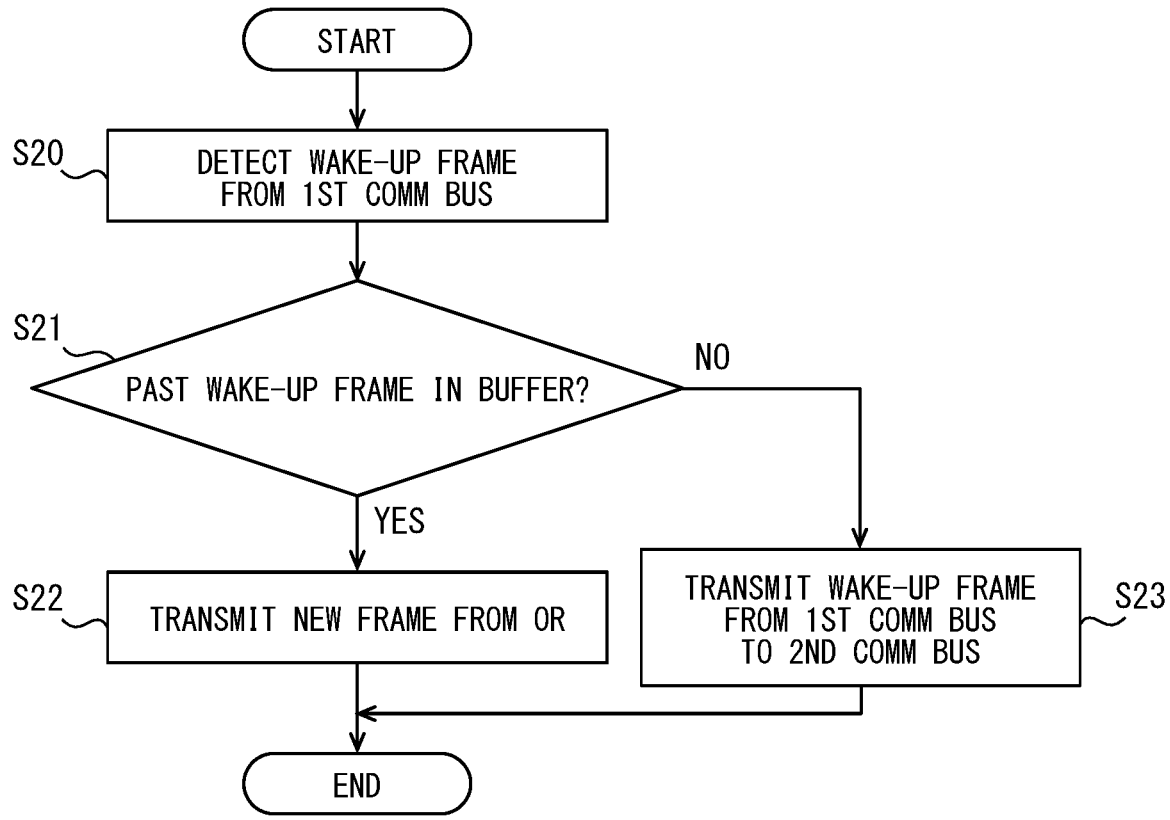
FIG. 3 is a flowchart showing a processing operation of the relay device according to the first embodiment.

The processing operation of the relay device 100 will be described with reference to FIG. 3.

In step S20, the wake-up frame from the first communication bus 401 is detected. The relay side controller 11 detects the wake-up frame transmitted to the first communication bus 401. As described above, the ECU side computation unit 112 transmits the wake-up frame to the first communication bus 401. In this case, the relay side controller 11 receives the wakeup frame via the first communication bus 401. Therefore, the relay side controller 11 detects the wakeup frame.

On the other hand, the relay side controller 12 cannot receive the wakeup frame transmitted to the first communication bus 401. Therefore, the relay side controller 12 cannot detect the wakeup frame from the first communication bus 401.

When the relay side controller 11 receives the wake-up frame, the relay side controller 11 relays the wake-up frame to ECUs 201 to 204 connected to the second communication bus 402. Therefore, the relay side controller 11 stores the wakeup frame received by itself in the transmission buffer 22. At this time, the relay side controller 11 stores the wake-up frame in the first buffer 22a as shown in the upper part of FIG. 6.

In step S21, it is determined whether or not there is a past wake-up frame in the transmission buffer. In step S21, the relay side controller 12 may function as a retention determination unit. The relay side controller 12 determines whether or not the wakeup frame is retained in the first buffer 22a. The relay side controller 12 determines whether or not the past wake-up frame is not erased and is stored in the first buffer 22a. When determining that the wakeup frame is retained in the first buffer 22a, the relay side controller 12 proceeds to step S22. When not determining that the wakeup frame is retained, the relay side controller 12 proceeds to step S23.

By the way, as shown in the upper part of FIG. 6, the first frame transmitted from the ECU 102 flows to the first communication bus 401 and is received by the ECUs 101, 103 and 104. Then, since the ECUs 101 and 103 are in the group G1, they wake up. On the other hand, the ECU 104 does not wake up because it is in the group G2.

Further, the relay device 100 receives the first frame via the first communication bus 401. The relay side computation unit 110 stores the first frame in the first buffer 22a in order to relay the first frame to the ECUs 201 to 204 connected to the second communication bus 402. The relay side controller 12 transmits the first frame stored in the first buffer 22a to the second communication bus 402 via the relay side transceiver 32.

However, the second communication bus 402 does not have an ECU belonging to the group G1. In this case, since the relay side controller 12 cannot receive the ACK response, the transmission of the first frame cannot be completed. Further, even when an error or a failure occurs in the second network 1002, the relay side controller 12 cannot temporarily complete the transmission of the first frame. Therefore, the first frame remains stored in the first buffer 22a. In other words, the first buffer 22a retains the first frame.

In this situation, the second frame transmitted from the ECU 102 flows to the first communication bus 401 and is received by the ECUs 101, 103, and 104, as shown in the lower part of FIG. 6. Then, since the ECU 104 is in the group G2, it wakes up. On the other hand, the ECUs 101 and 103 remain in the wake-up state.

The relay device 100 receives the second frame via the first communication bus 401. The relay side computation unit 110 stores the second frame in the first buffer 22a in order to relay the second frame to the ECUs 201 to 204 connected to the second communication bus 402.

However, the first frame is retained in the first buffer 22a. Therefore, the relay side controller 12 cannot transmit the second frame stored in the first buffer 22a to the second communication bus 402 via the relay side transceiver 32. In this case, the relay side controller 12 determines in step S21 that the wakeup frame is retained, and proceeds to step S22.

In particular, the present embodiment employs the transmission buffers 21 to 2n including the first buffers 21a to 2na and the second buffers 21b to 2nb. Therefore, the relay side controllers 11 and 12 proceed to step S22 only when the wakeup frame is retained in the first buffers 21a and 22a. Since the relay device 100 includes the first buffers 21a to 2na which are areas for storing the NM frame, it is not necessary to determine whether the preceding frame is the NM frame, and the relay device 100 can overwrite immediately. Further, in this case, the relay device 100 eliminates the process of checking the frame type by software, and the software processing efficiency is improved.

However, the present disclosure is not limited to this. That is, the transmission buffers 21 to 2n do not have to be divided into the first buffers 21a to 21na and the second buffers 21b to 21nb. In this case, the relay side controllers 11 and 12 may proceed to step S22 when the wakeup frame is retained in the transmission buffers 21 to 2n.

In step S22, a new frame resulting from OR (i.e., logical sum) is used to overwrite and transmitted. In step S22, the relay side controller 12 may function as a retention transmission unit. When the relay side controller 12 determines that the wakeup frame is retained, the relay side controller 12 transmits the wakeup frame, which is received at the present time (i.e., this time) and stored in the first buffer 22a, from the relay side transceiver 32 while avoiding the retention of the wakeup frame. In this way, the process of avoiding the retention and transmitting the wakeup frame can be said to be a retention avoidance process.

One of the specific methods of the retention avoidance process is to overwrite with a new frame resulting from OR (i.e., logical sum) and transmit it. The relay side controller 12 transmits a new NM frame, which is generated by OR of the retained NM frame and the NM frame received at the present time (i.e., this time), from the relay side transceiver 32.

Here, using the OR will be described as an example of the retention avoidance process with reference to FIG. 5. The relay side controller 12 calculates OR (i.e., logical sum) of the data of the retained first frame and the data of the second frame received at the present time. The relay side controller 12 calculates OR of the group information of the retained first frame and the group information of the subsequent second frame. Then, the relay side controller 12 overwrites the first buffer 22a with the NM frame including each new data for which the logical sum is taken. Then, the relay side controller 12 transmits the new NM frame stored in the first buffer 22a, from the relay side transceiver 32.

As described above, even when the NM frame is retained in the first buffer 22a, the relay device 100 transmits the NM frame, which is received at the present time and stored in the first buffer 22a, while avoiding the retention of the NM frame retention. Therefore, the relay device 100 can reliably transmit the NM frame.

Further, the new NM frame is obtained by calculating OR (i.e., logical sum) as described above. Therefore, the new NM frame has more information indicating the wake-up instruction than each of the first frame and the second frame. Therefore, the relay device 100 can provide a high possibility that the ECU wakes up by transmitting a new NM frame, and can suppress the retention of the NM frame.

The retention avoidance process is not limited to this. The relay side controllers 11 and 12 may exchange the transmission order of the retained NM frame and the NM frame received at the present time, and transmit the NM frame received at the present time from the relay side transceivers 31 and 32.

For example, suppose a case where the first frame is retained as described above. In such a case, the relay side controller 12 changes the transmission order of the first frame and the second frame received at the present time, and transits the second frame from the relay side transceiver 32. In this case, the relay side controller 12 rewrites the first frame stored in the first buffer 22a to the second frame. Then, the relay side controller 12 transmits the second frame stored in the first buffer 22a after rewriting. That is, the relay side controller 12 preferentially transmits the subsequent NM frame over the retained NM frame.

This also allows the relay device 100 to reliably transmit NM frames. Further, even if the relay device 100 cannot wake up the ECU in the preceding NM frame, there is a high possibility that the ECU can be waked up in the succeeding NM frame. Therefore, the relay device 100 can suppress the retention of the NM frame.

Further, the relay side controllers 11 and 12 may alternately transmit the retained NM frame and the NM frame received at the present time, from the relay side transceivers 31 and 32 at regular intervals. For example, when the first frame is retained as described above, the relay side controller 12 alternately transmits the first frame and the second frame from the relay side transceiver 32 at regular intervals. In this case, the relay side controller 12 transmits the first frame from the relay side transceiver 32, rewrites the first frame to the second frame after a certain period of time, and transmits the second frame from the relay side transceiver 32. Then, after a certain period of time after transmitting the second frame from the relay side transceiver 32, the relay side controller 12 rewrites the second frame to the first frame and transmits the first frame from the relay side transceiver 32. The relay side controller 12 repeatedly executes the above.

This also allows the relay device 100 to reliably transmit NM frames. Further, the relay device 100 is more likely to be able to wake up the ECU in the subsequent NM frame as in the above-mentioned retention avoidance process, and can suppress the retention of the NM frame.

In step S23, the wake-up frame is transmitted from the first communication bus 401 to the second communication bus 402. When not determining that the wakeup frame is retained, the relay side controller 12 transmits the wakeup frame, which is received at the present time and stored in the first buffer 22a, from the relay side transceiver 32. That is, when the NM frame is not retained, the relay side controller 12 transmits the NM frame to the second communication bus 402 without performing the retention avoidance process.

Figure 4:
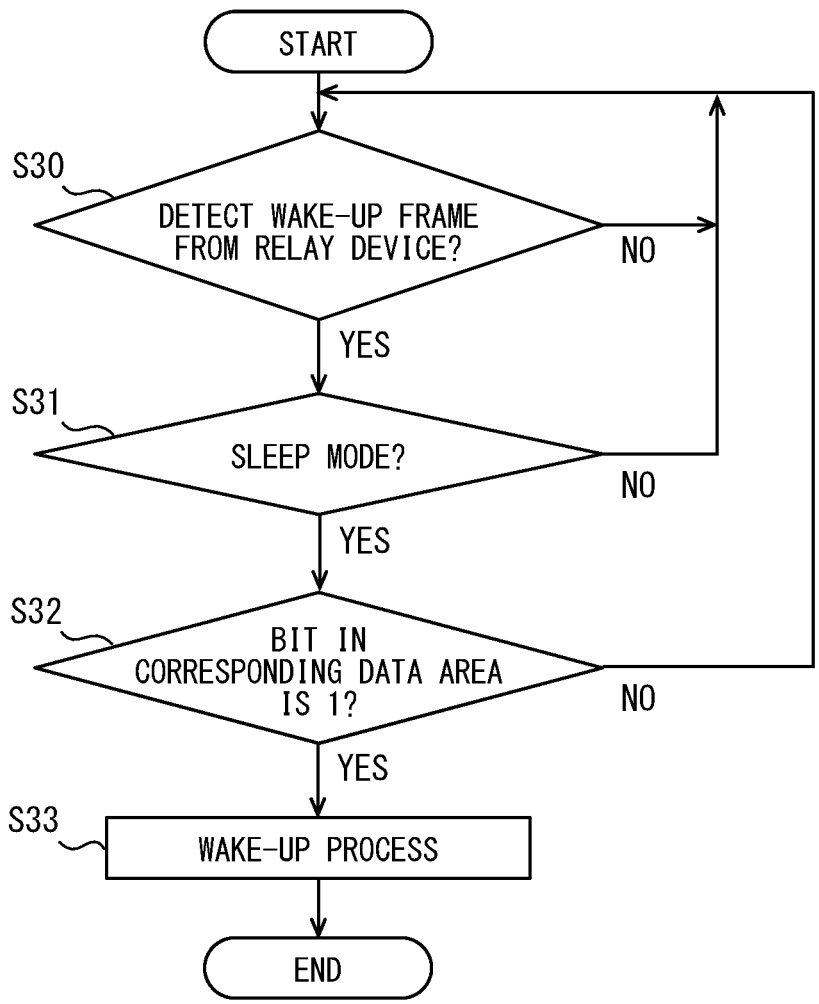
FIG. 4 is a flowchart showing a reception processing operation of the ECU according to the first embodiment.

The processing operation of the ECU 202 for receiving the NM frame will be described with reference to FIG. 4. FIG. 4 is mainly a processing operation executed by the ECU side controller of the ECU 202. Hereinafter, the ECU side controller of the ECU 202 is simply referred to as an ECU side controller. Similarly, the ECU side transceiver of the ECU 202 is simply referred to as an ECU side transceiver.

In step S30, it is determined whether or not a wake-up frame from the relay device 100 is detected. The ECU side controller determines whether or not the wakeup frame is received via the ECU side transceiver. When the ECU side controller determines that the wake-up frame is received, it considers that the wake-up frame is detected and proceeds to step S31. When the ECU side controller does not determine that the wake-up frame is received, it does not consider that the wake-up frame is detected and repeats step S30.

In step S31, it is determined whether or not the sleep mode is set. The ECU side controller determines whether or not the ECU side transceiver is in sleep mode. When the ECU side controller determines that the ECU side transceiver is in the sleep mode, the ECU proceeds to step S32. When the ECU side controller does not determine that the ECU side transceiver is in sleep mode, the ECU returns to step S30.

In step S32, it is determined whether or not the bit of the corresponding data area is 1. The ECU side controller determines whether or not the bit of the data area corresponding to itself is 1 in the received wakeup frame. That is, the ECU side controller confirms the data area of the received wakeup frame. Then, the ECU side controller determines whether or not the bit assigned to the group to which the ECU belongs is 1 in the group information stored in the data area.

Then, when the ECU side controller determines that it is 1, the process proceeds to step S33. When the ECU side controller does not determine that it is 1, the process returns to step S30.

In step S33, the wake-up process is performed. The ECU side controller performs the wake-up process of the ECU 202. That is, the ECU side controller performs the wake-up process in order to put the ECU 202 from the sleep state into the activated state.

The preferred embodiment of the present disclosure has been described above. However, the present disclosure is not limited to the above-described embodiment, and various modifications can be made without departing from the spirit of the present disclosure. Hereinafter, the second to fourth embodiments will be described as other embodiments of the present disclosure. The above-described embodiment and the second to fourth embodiments can be carried out individually, but can also be carried out in combination as appropriate. The present disclosure is not limited to the combinations shown in the embodiments, but can be implemented by various combinations.

Second Embodiment

Figure 7:
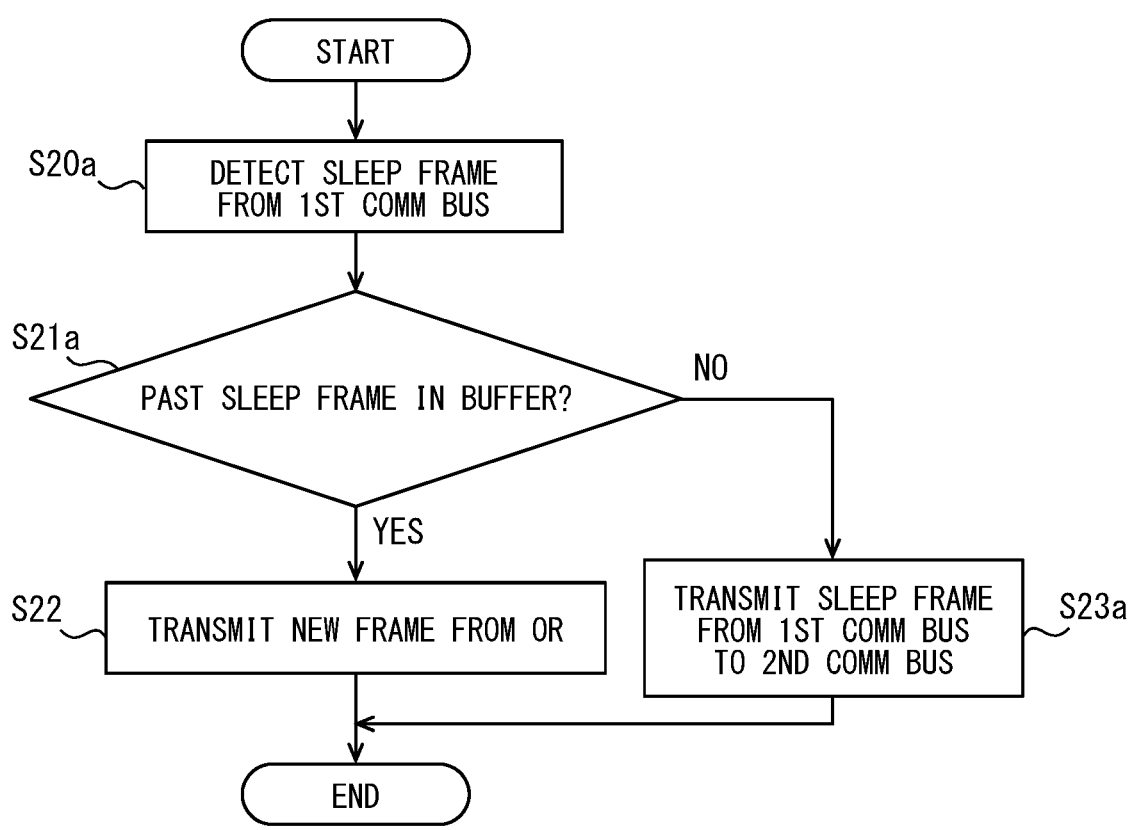
FIG. 7 is a flowchart showing a processing operation of a relay device according to a second embodiment.
Figure 8:
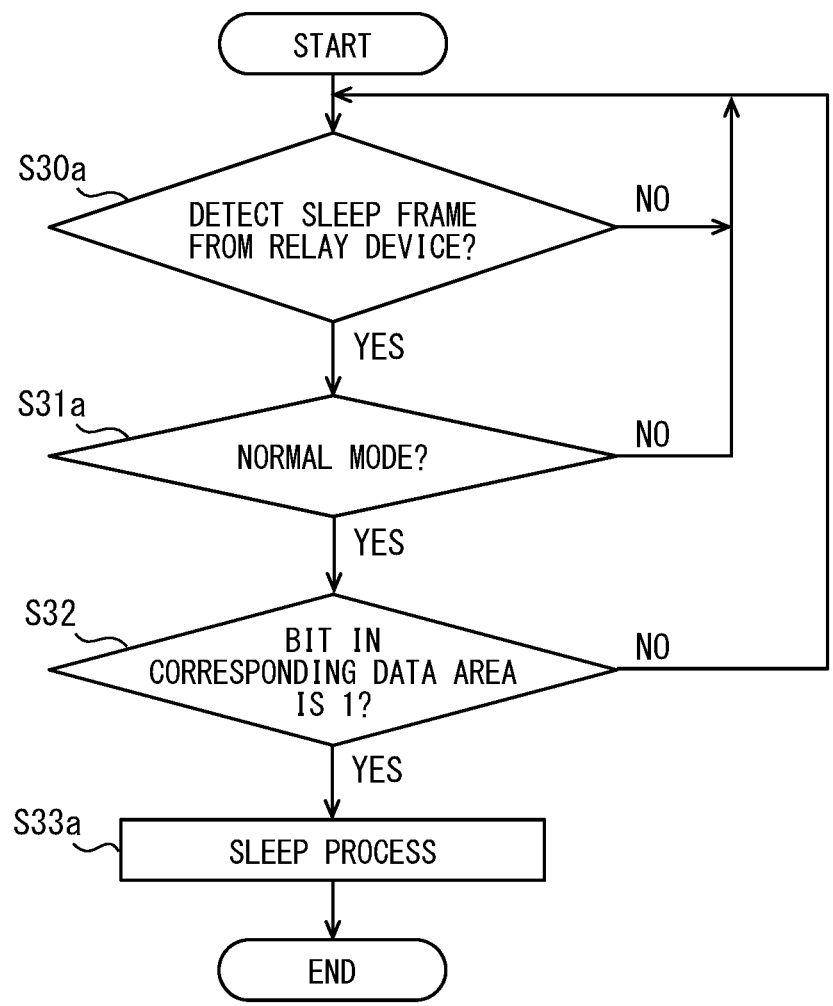
FIG. 8 is a flowchart showing a reception processing operation of the ECU according to the second embodiment.

The relay device of a second embodiment will be described with reference to FIGS. 7, 8 and 9. The present embodiment is different from the first embodiment in that the sleep frame is relayed as the NM frame.

The relay device 100 of the second embodiment has the same configuration as the relay device 100. The in-vehicle network including the relay device 100 of the second embodiment has the same configuration as that of the first embodiment. Therefore, in the present embodiment, the same reference numerals as those in the first embodiment will be used for description. Further, in the flowchart, the same step number is assigned to the same process as in the above embodiment. This point is the same in other embodiments.

Figure 9:
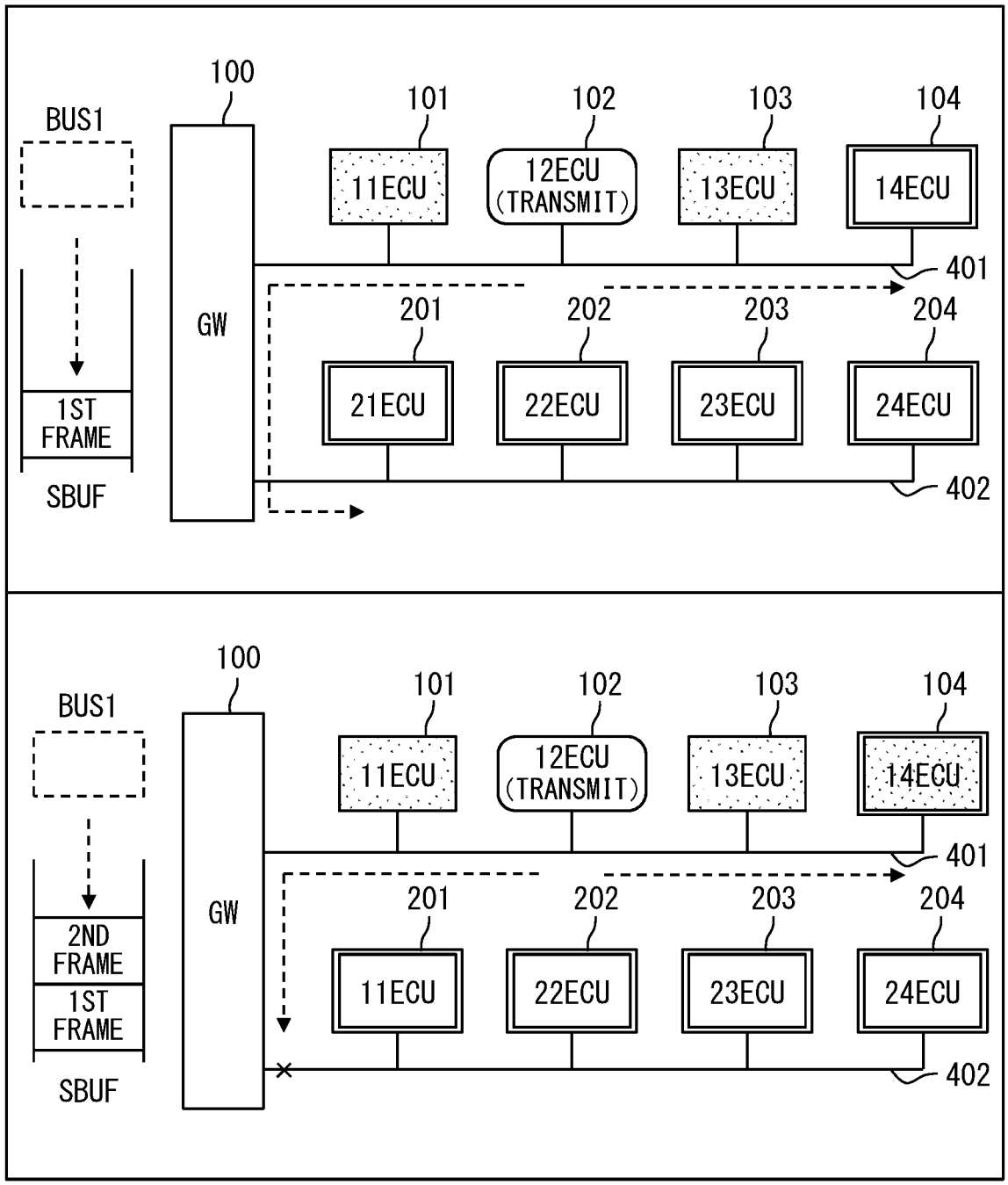
FIG. 9 is an image diagram showing a flow of NM frames according to the second embodiment.

FIG. 9 shows the flow of the NM frame via the relay device 100, as in FIG. 6. In the example of FIG. 9, the ECU 102 transmits the first frame, which is an NM frame including information indicating a sleep instruction for the ECUs 101 and 103 belonging to the group G1. After that, the ECU 102 transmits a second frame, which is an NM frame, including information indicating a sleep instruction for the ECUs 104, 201 to 204 belonging to the group G2. Hereinafter, this NM frame is also referred to as a sleep frame. Then, FIG. 9 employs a situation in which the ECU 102 transmits a sleep frame while the ECU 101, the ECUs 103 to 104, and the ECUs 201 to 204 are activated.

First, the processing operation of the relay device 100 will be described with reference to FIG. 7. That is, FIG. 7 is a processing operation of the relay device 100 when the ECU 102 transmits a sleep frame.

In step S20a, a sleep frame from the first communication bus 401 is detected. The relay side controller 11 detects the sleep frame transmitted to the first communication bus 401. As described above, the ECU side computation unit 112 transmits the sleep frame to the first communication bus 401. In this case, the relay side controller 11 receives the sleep frame via the first communication bus 401. Therefore, the relay side controller 11 detects the sleep frame.

On the other hand, the relay side controller 12 cannot receive the sleep frame transmitted to the first communication bus 401. Therefore, the relay side controller 12 cannot detect the sleep frame from the first communication bus 401.

When the relay side controller 11 receives the sleep frame, the relay side controller 11 relays the sleep frame to the ECUs 201 to 204 connected to the second communication bus 402. Therefore, the relay side controller 11 stores the sleep frame received by itself in the transmission buffer 22. In this case, the relay side controller 11 stores the sleep frame in the first buffer 22a as shown in the upper part of FIG. 9. Step S21a is different from step S21 in that it determines the presence or absence of the past sleep frame instead of the past wakeup frame.

By the way, as shown in the upper part of FIG. 9, the first frame transmitted from the ECU 102 flows to the first communication bus 401 and is received by the ECUs 101, 103 and 104. Then, since the ECUs 101 and 103 are in the group G1, they sleep. On the other hand, the ECU 104 does not sleep because it is in the group G2.

Further, as in the first embodiment, the relay device 100 transmits the first frame stored in the first buffer 22a by the relay side controller 12 to the second communication bus 402 via the relay side transceiver 32. However, since the second communication bus 402 does not have an ECU belonging to the group G1, the first frame is retained in the first buffer 22a.

In this situation, the second frame transmitted from the ECU 102 flows to the first communication bus 401 and is received by the ECUs 101, 103, and 104, as shown in the lower part of FIG. 9. Then, since the ECU 104 is in the group G2, it sleeps. On the other hand, the ECUs 101 and 103 remain in the sleep state. Further, the relay device 100 receives the second frame via the first communication bus 401, and the relay side computation unit 110 stores the second frame in the first buffer 22a.

However, since the first frame is retained in the first buffer 22a, the relay side controller 12 cannot transmit the second frame stored in the first buffer 22a to the second communication bus 402 via the relay side transceiver 32. In this case, the relay side controller 12 determines in step S21 that the sleep frame is retained, and proceeds to step S22 as in the first embodiment.

In step S23a, the sleep frame is transmitted from the first communication bus 401 to the second communication bus 402. When not determining that it is retained, the relay side controller 12 transmits the sleep frame, which is received at the present time and stored in the first buffer 22a, from the relay side transceiver 32. That is, when the NM frame is not retained, the relay side controller 12 transmits the NM frame to the second communication bus 402 without performing the retention avoidance process.

The processing operation of the ECU 202 that receives the NM frame will be described with reference to FIG. 8. FIG. 8 is mainly a processing operation executed by the ECU side controller of the ECU 202.

In step S30a, it is determined whether or not a sleep frame from the relay device 100 is detected. The ECU side controller determines whether or not a sleep frame is received via the ECU side transceiver. When the ECU side controller determines that the sleep frame is received, it considers that the sleep frame is detected and proceeds to step S31a. If the ECU side controller does not determine that the sleep frame is received, it does not consider that the sleep frame is detected and repeats step S30a.

In step S31a, it is determined whether or not the mode is normal. The ECU side controller determines whether or not the ECU side transceiver is in the normal mode. When the ECU side controller determines that the ECU side transceiver is in the normal mode, the ECU side controller proceeds to step S32. When not determining that the ECU side transceiver is in the normal mode, the ECU side controller returns to step S30a.

In step S33a, sleep processing is performed. The ECU side controller executes the sleep process of the ECU 202. That is, the ECU side controller executes the sleep process in order to put the ECU 202 in the normal state (activated state) to sleep.

The present embodiment can exert the same effect as that of the first embodiment.

Third Embodiment

Figure 10:
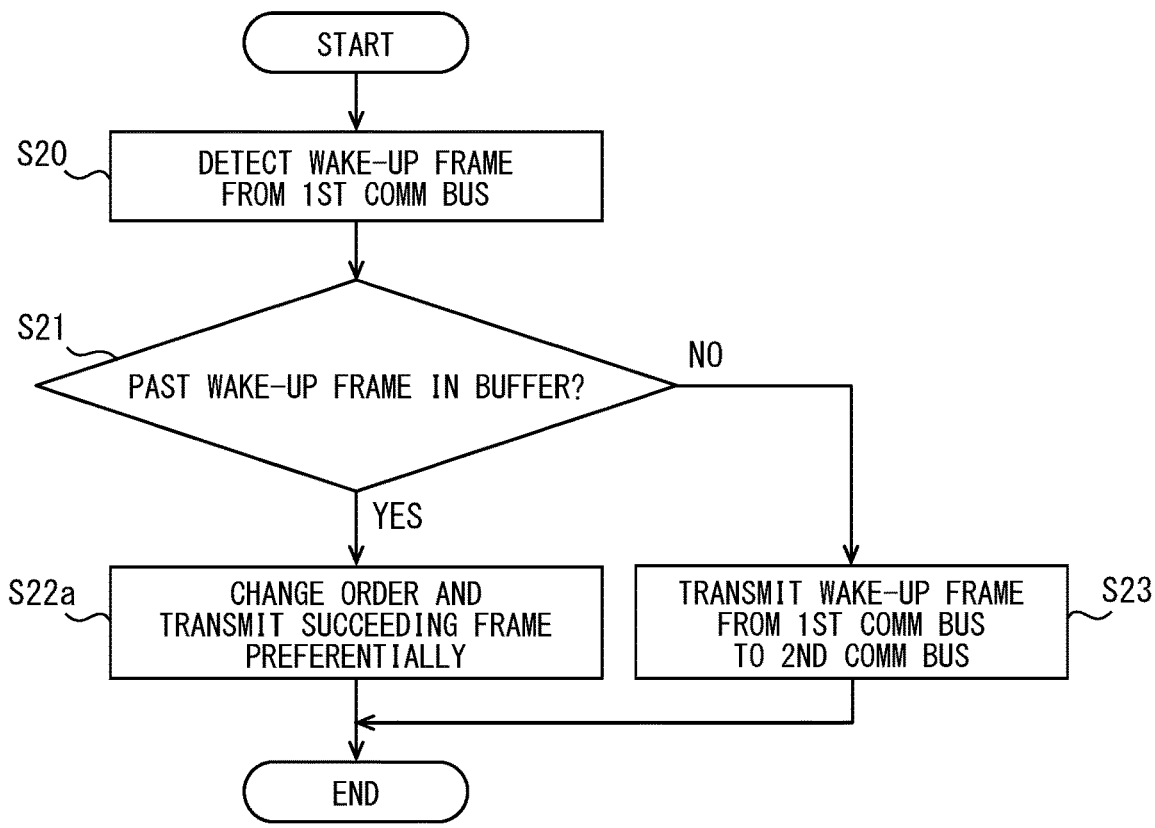
FIG. 10 is a flowchart showing a processing operation of a relay device according to a third embodiment.
Figure 11:
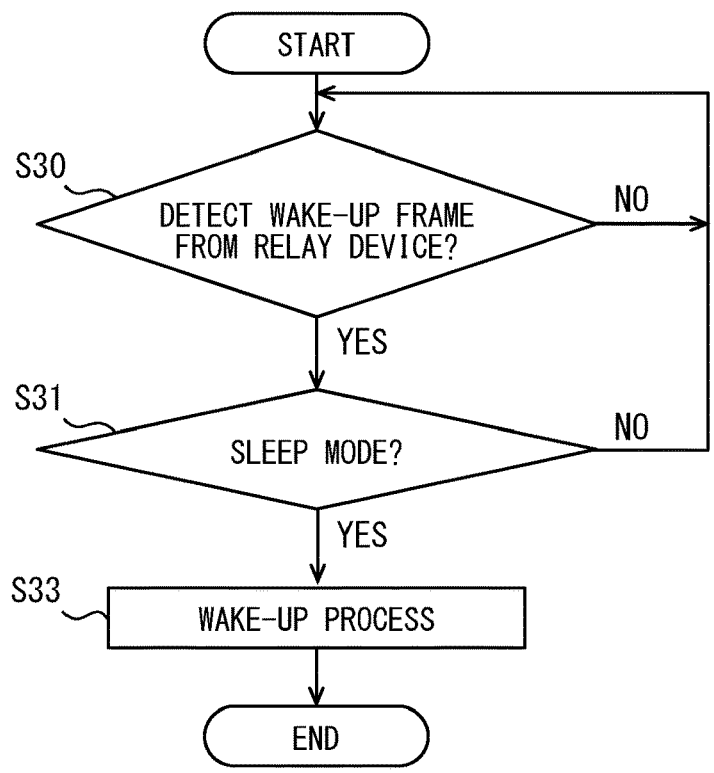
FIG. 11 is a flowchart showing a reception processing operation of an ECU according to the third embodiment.

The relay device 100 according to a third embodiment will be described with reference to FIGS. 10, 11, and 12. The present embodiment is different from the first embodiment in that the ECU does not support partial networking. Therefore, in the present embodiment, each ECU is not selectively waked up or put to sleep. Therefore, the wake-up frame of the present embodiment includes information indicating a wake-up instruction to all ECUs. Further, each network 100$_1$ to 100$n$ of the present embodiment can be said to be a non-partial introduced network.

First, the processing operation of the relay device 100 will be described with reference to FIGS. 10 and 12. That is, FIG. 10 is a processing operation of the relay device 100 when the ECU 102 transmits a wake-up frame.

Figure 12:
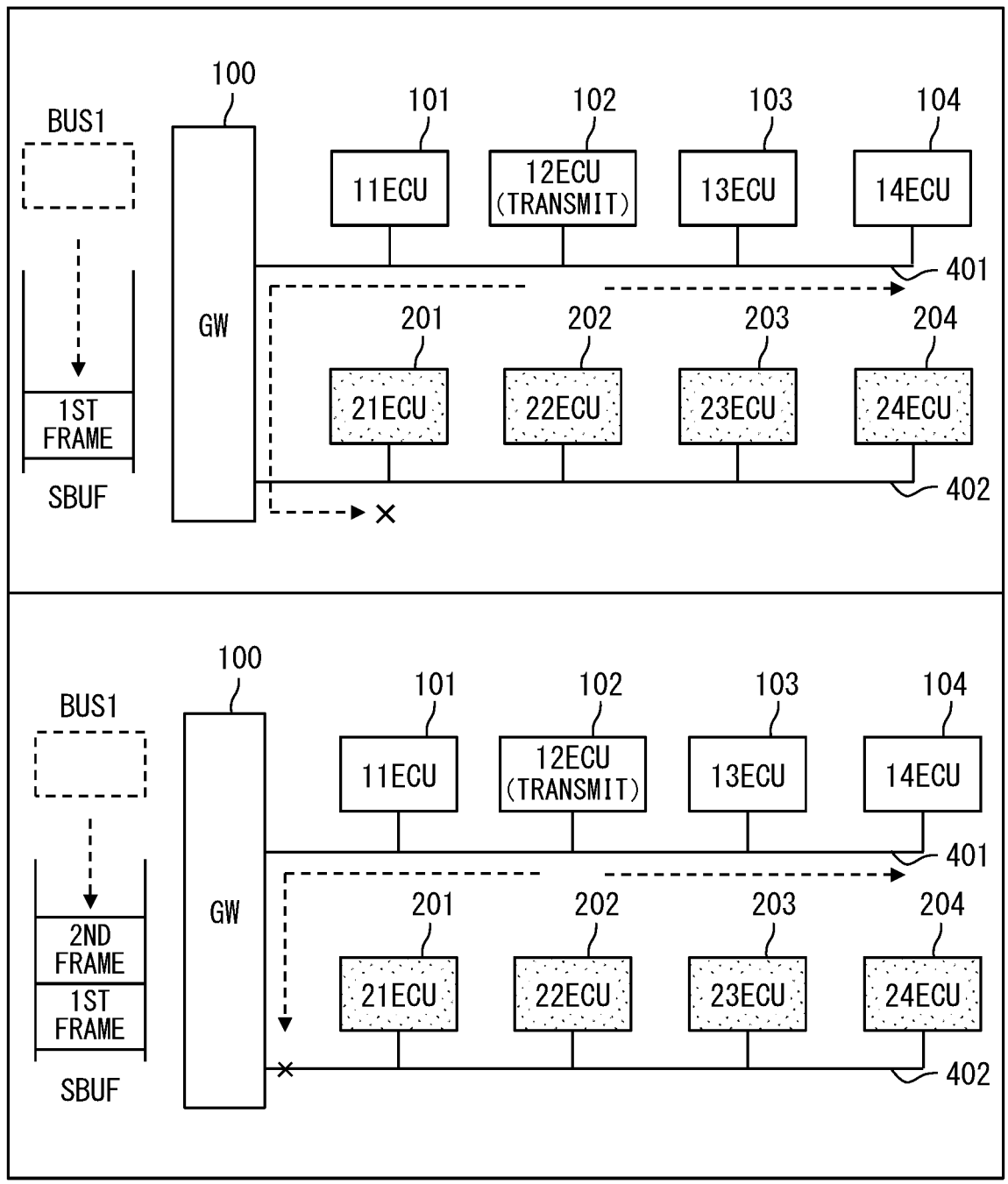
FIG. 12 is an image diagram showing a flow of NM frames according to the third embodiment.

FIG. 12 employs a situation in which the ECU 101, the ECUs 103 to 104, and the ECUs 201 to 204 are in the sleep state, and the ECU 102 transmits a wakeup frame. FIG. 12 shows the flow of the wake-up frame via the relay device 100. More specifically, the upper part of FIG. 12 shows the flow of the wakeup frame in a state where the wakeup frame is not retained. The lower part of FIG. 12 shows the flow of the wakeup frame in the state where the wakeup frame is retained.

In FIG. 12, only the first network 100$_1$ and the second network 100$_2$ are shown for simplification of the drawings. The broken line arrow in FIG. 12 indicates the transmission path of the wake-up frame, which is one of the communication frames.

In the example of FIG. 12, the ECU 102 transmits the first frame and the second frame, which are wake-up frames. This wake-up frame does not wake up a specific ECU. This wake-up frame wakes up ECUs 101, 103, 104 connected to the first communication bus 401, and the ECUs 201 to 204 connected to the second communication bus 402.

As shown in the upper part of FIG. 12, the first frame transmitted from the ECU 102 flows to the first communication bus 401 and is received by the ECUs 101, 103, and 104. Then, the ECUs 101 and 103 wake up. Further, the relay device 100 receives the first frame via the first communication bus 401. The relay side computation unit 110 stores the first frame in the first buffer 22a in order to relay the first frame to the ECUs 201 to 204 connected to the second communication bus 402. The relay side controller 12 transmits the first frame stored in the first buffer 22a to the second communication bus 402 via the relay side transceiver 32.

However, as shown in the upper part of FIG. 12, when an error or a failure occurs in the second network 100$_2$, the relay side controller 12 cannot temporarily complete the transmission of the first frame. Therefore, the first frame remains stored in the first buffer 22a.

After that, the ECU 102 transmits the second frame. That is, the ECU 102 transmits the wakeup frame again. In this situation, the second frame transmitted from the ECU 102 flows to the first communication bus 401 and is received by the ECUs 101, 103, and 104, as shown in the lower part of FIG. 12. Then, the ECUs 101, 103, and 104 remain in the wake-up state.

The relay device 100 receives the second frame via the first communication bus 401. The relay side computation unit 110 stores the second frame in the first buffer 22a in order to relay the second frame to the ECUs 201 to 204 connected to the second communication bus 402.

However, the first frame is retained in the first buffer 22a. Therefore, the relay side controller 12 cannot transmit the second frame stored in the first buffer 22a to the second communication bus 402 via the relay side transceiver 32. In this case, the relay side controller 12 determines in step S21 that the wakeup frame is retained, and proceeds to step S22a.

In step S22a, the transmission order is changed, and the succeeding frame is preferentially transmitted. In step S22a, the relay side controller 12 may function as a retention transmission unit. When the relay side controller 12 determines that the first frame is retained, as in the first embodiment, the relay side controller 12 transmits the wake-up frame, which is received at the present time and stored in the first buffer 22a, from the relay side transceiver 32 while avoiding the retention of the wake-up frame. Here, as an example of the retention avoidance process, an example of changing the transmission order is adopted. This process can be applied with reference to the first embodiment.

However, the retention avoidance process of the present embodiment is not limited to this. Similar to the first embodiment, the relay side controllers 11 and 12 may alternately transmit the retained NM frame and the NM frame received at the present time from the relay side transceivers 31 and 32 at regular intervals.

Further, the relay side controllers 11 and 12 may discard the retained NM frame and transmit the NM frame received at the present time from the relay side transceivers 31 and 32.

For example, when the first frame is retained as described above, the relay side controller 12 deletes the first frame stored in the first buffer 22a. Further, the relay side controller 12 stores the second frame received at the present time in the first buffer 22a. Then, the relay side controller 12 transmits the second frame from the relay side transceiver 32. As a result, the relay device 100 can suppress the retention of NM frames, as in the case of alternately transmitting at regular intervals.

The processing operation of the ECU 202 that receives the NM frame will be described with reference to FIG. 11. FIG. 11 is mainly a processing operation executed by the ECU side controller of the ECU 202. The ECU side controller executes steps S30 and S31. Then, the ECU side controller executes step S33 without executing step S32.

The present embodiment can exert the same effect as that of the first embodiment.

Fourth Embodiment

The relay device 100 of a fourth embodiment will be described with reference to FIGS. 13, 14, and 15. In the present embodiment, as in the third embodiment, the ECU does not support partial networking.

In non-partial introduced networks, NM frames continue to be transmitted on a regular basis. In this network, if the NM frame cannot be received for a certain period of time for some reason, each ECU on the bus goes to sleep. That is, the ECU goes into a sleep state when the NM frame is interrupted.

First, the processing operation of the relay device 100 will be described with reference to FIGS. 13 and 15. That is, FIG. 13 is a processing operation of the relay device 100 when the ECU 102 transmits a wake-up frame.

Figure 15:
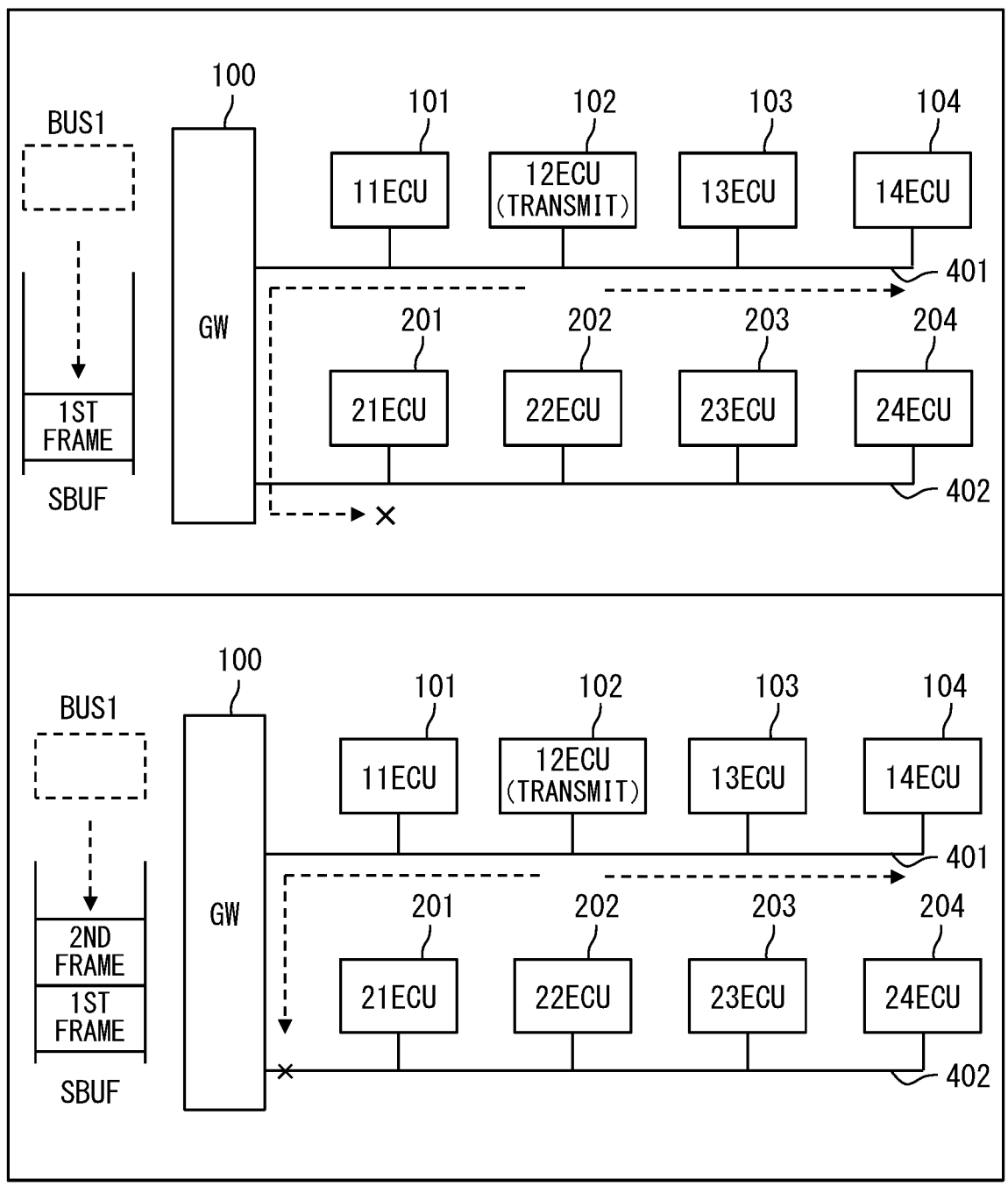
FIG. 15 is an image diagram showing a flow of NM frames according to the fourth embodiment.

In FIG. 15, a situation is adopted in which the ECU 101, the ECUs 103 to 104, and the 201 to 204 are in a normal state, and the ECU 102 transmits a wakeup frame. FIG. 15 shows the flow of the wake-up frame via the relay device 100. More specifically, the upper part of FIG. 15 shows the flow of the wakeup frame in a state where the wakeup frame is not retained. The lower part of FIG. 15 shows the flow of the wakeup frame in the state where the wakeup frame is retained.

In FIG. 15, only the first network 1001 and the second network 1002 are shown in order to simplify the drawings. The broken line arrow in FIG. 15 indicates the transmission path of the wake-up frame, which is one of the communication frames.

In the example of FIG. 15, the ECU 102 transmits the first frame and the second frame, which are wake-up frames. The first frame transmitted from the ECU 102 flows to the first communication bus 401 and is received by the ECUs 101, 103, and 104. Further, the relay device 100 receives the first frame via the first communication bus 401. The relay side computation unit 110 stores the first frame in the first buffer 22a in order to relay the first frame to the ECUs 201 to 204 connected to the second communication bus 402. The relay side controller 12 transmits the first frame stored in the first buffer 22a to the second communication bus 402 via the relay side transceiver 32.

However, as shown in the upper part of FIG. 15, when an error or a failure occurs in the second network 1002, the relay side controller 12 cannot temporarily transmit the first frame. That is, the first frame is interrupted on the second communication bus 402. Therefore, the first frame remains stored in the first buffer 22a.

After that, the ECU 102 transmits the second frame. In this situation, the second frame transmitted from the ECU 102 flows to the first communication bus 401 and is received by the ECUs 101, 103, and 104, as shown in the lower part of FIG. 15. Then, the ECUs 101, 103, and 104 remain in the wake-up state. The relay device 100 receives the second frame via the first communication bus 401 and stores the second frame in the first buffer 22a.

However, the first frame is retained in the first buffer 22a. Therefore, the relay side controller 12 cannot transmit the second frame stored in the first buffer 22a to the second communication bus 402 via the relay side transceiver 32. In this case, if the ECUs 201 to 204 cannot receive the first frame or the second frame for a certain period of time, the ECUs 201 to 204 unintentionally go to sleep.

Figure 13:
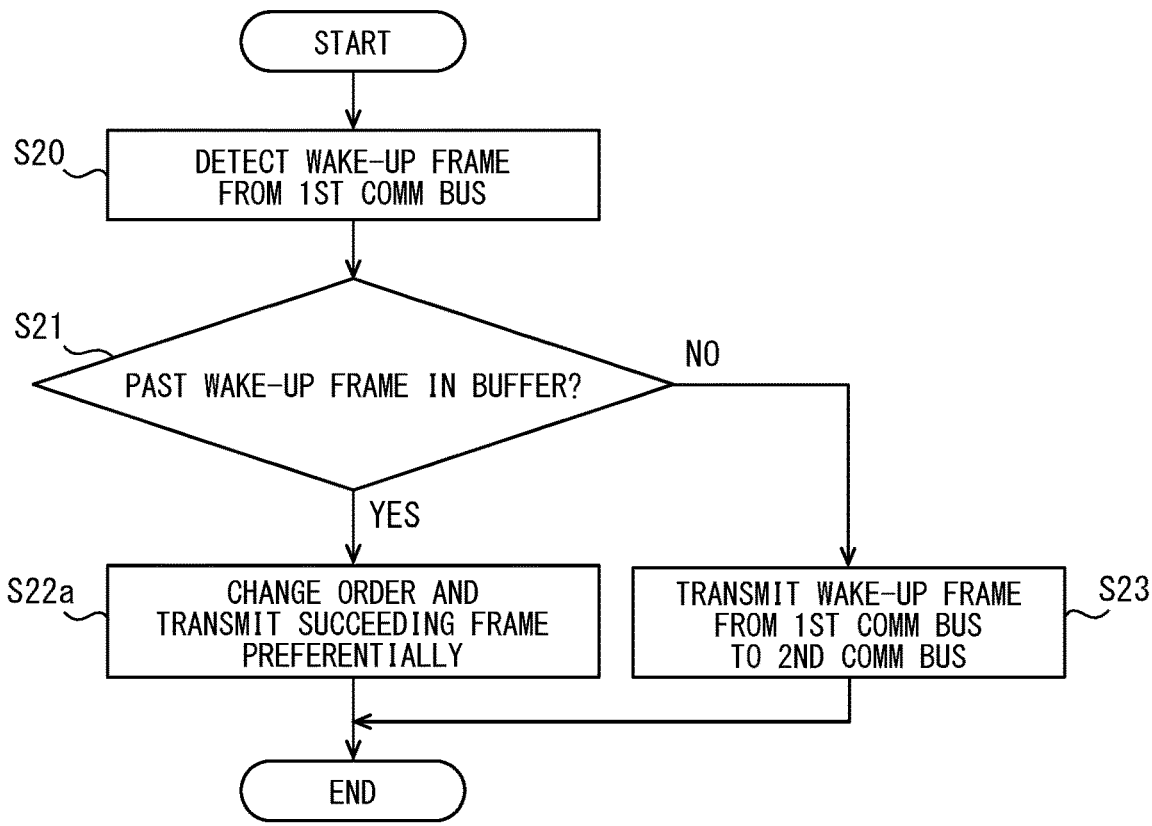
FIG. 13 is a flowchart showing a processing operation of a relay device according to a fourth embodiment.
Figure 14:
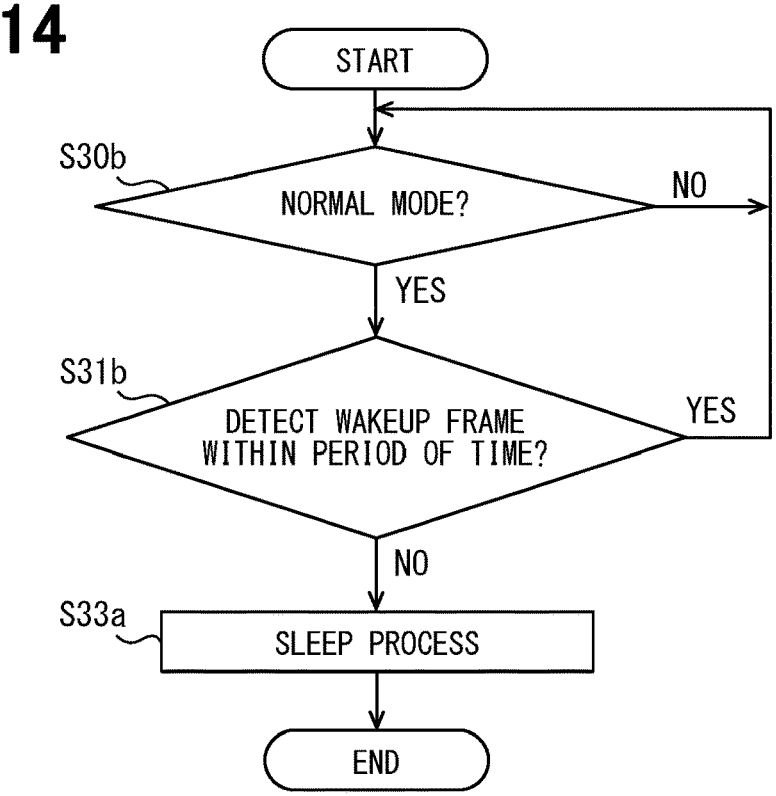
FIG. 14 is a flowchart showing a reception processing operation of the ECU according to the fourth embodiment.

Therefore, in step S21 of FIG. 13, the relay side controller 12 determines that the wakeup frame is retained and proceeds to step S22a. As a result, the relay side controller 12 can transmit at least the second frame to the second communication bus 402. Therefore, the relay device 100 can prevent the ECU from unintentionally going to sleep.

The processing operation of the ECU 202 for receiving the NM frame will be described with reference to FIG. 14. FIG. 14 is mainly a processing operation executed by the ECU side controller of the ECU 202.

In step S30b, it is determined whether or not the mode is normal. Step S30b is the same as step S31a in FIG. 8.

In step S31b, it is determined whether or not the wakeup frame from the relay device is detected for a certain period of time. When determining that the wake-up frame is not detected for a certain period of time, the ECU side controller proceeds to step S33a. When not determining that the wake-up frame is not detected for a certain period of time, the ECU side controller returns to step S30b. That is, the ECU side controller maintains the normal mode while receiving the wakeup frame.

The present embodiment can exert the same effect as that of the first embodiment.

Although the present disclosure has been described in accordance with the examples, it is understood that the present disclosure is not limited to such examples or structures. The present disclosure encompasses various modifications and variations within an equivalent scope. In addition, while the various elements are shown in various combinations and configurations, which are exemplary, other combinations and configurations, including more, less or only a single element, are also within the spirit and scope of the present disclosure.

For reference to further explain features of the present disclosure, the description is added as follows.

There is disclosed a relay device provided between a plurality of communication buses. The relay device relays the communication frame between the nodes connected to each communication bus. The relay device receives an activation signal from the first network via the first receiver, and gives the received activation signal to the input side of the second transmitter via the first connection line. This activation signal is transmitted to the second network via the second transmitter.

Although it is a unknown technique, the relay device may be provided with a transmission buffer corresponding to each of a plurality of communication buses. Further, a communication frame may include a management frame that manages at least one of, of the node, entry into and departure from the network.

In this case, when the relay device receives the management frame transmitted from the node, the relay device stores the management frame in the corresponding transmission buffer. Then, the relay device transmits the management frame stored in the corresponding transmission buffer to another communication bus. In this way, the relay device relays the management frame between the nodes connected to the different communication buses.

However, in the relay device, the management frame may stay or be retained in the transmission buffer. In this case, the relay device repeatedly transmits the retained management frame, and there is a problem that the subsequent management frame cannot be transmitted.

It is thus desired to provide a relay device capable of reliably transmitting a management frame.

An aspect of the present disclosure described herein is set forth in the following clauses.

According to an aspect of the present disclosure, a relay device is provided to be connected to a plurality of networks respectively having corresponding communication buses connected to a plurality of nodes. Each communication bus is connected to at least one of the nodes. The relay device relays a communication frame between the nodes connected to the different communication buses that are mutually different from each other. The communication frame includes a management frame configured to manage, of the node, (i) entry into the network, or (ii) departure from the network, or (iii) entry into and departure from the network. The relay device includes a plurality of communicator units and a plurality of communication controller units. The plurality of communicator units are provided respectively to correspond to the plurality of communication buses. Each communicator unit is configured to receive and transmit the management frame via the corresponding communication bus. The plurality of communication controller units are provided respectively to correspond to the plurality of communicator units. The communication controller units are configured to control communication in the corresponding communicator units. The communication controller units respectively include corresponding transmission buffers configured to store the management frame received by the communicator units. The communication controller unit includes a retention determination unit and a retention transmission unit. The retention determination unit is configured to determine whether or not the transmission buffer corresponding to the communication controller unit retains the management frame, which is to be transmitted by the communicator unit corresponding to the communication controller unit. In response to the retention determination unit determining that the transmission buffer corresponding to the communication controller unit retains the management frame, the retention transmission unit is configured to transmit the management frame, which is received at a present time and stored in the transmission buffer, from the communicator unit corresponding to the communication controller unit while avoiding the management frame from being retained.

According to the above configuration of the relay device, even when the management frame is retained in the transmission buffer, the management frame received a the present time and stored in the transmission buffer is transmitted while avoiding the retention of the management frame. Therefore, the relay device can reliably transmit the management frame.

What is claimed is:

1. A relay device connected to a plurality of networks respectively having corresponding communication buses connected to a plurality of nodes, each communication bus being connected to at least one node of the plurality of nodes, the relay device relaying a communication frame between nodes of the plurality of nodes connected to communication buses that are mutually different from each other, the communication frame including a management frame configured to manage, of a node of the plurality of nodes, (i) entry into a network of the plurality of networks, or (ii) departure from the network, or (iii) entry into and departure from the network, the relay device comprising:
a plurality of communicator units provided respectively to correspond to the communication buses, each communicator unit of the plurality of communicator units configured to receive and transmit the management frame via the corresponding communication bus; and
a plurality of communication controller units provided respectively to correspond to the plurality of communicator units, the plurality of communication controller units configured to control communication in the corresponding plurality of communicator units, the plurality of communication controller units respectively including corresponding transmission buffers configured to store the management frame received by the corresponding plurality of communicator units,
wherein each communication controller unit of the plurality of communication controller units comprises:
a retention determination unit configured to determine whether or not a transmission buffer corresponding to the communication controller unit retains the management frame, which is to be transmitted by a communicator unit of the plurality of communicator units corresponding to the communication controller unit; and in response to the retention determination unit determining that the transmission buffer corresponding to the communication controller unit retains the management frame, a retention transmission unit configured to transmit the management frame, which is received at a present time and stored in the transmission buffer, from the communicator unit corresponding to the communication controller unit while avoiding the management frame from being retained.

2. The relay device according to claim 1, wherein:
the management frame contains a plurality of data indicating, of each of the nodes of the plurality of nodes, the entry into the network and the departure from the network.

3. The relay device according to claim 1, wherein:
in response to the management frame being retained in the transmission buffer corresponding to the communication controller unit, the communication controller unit is configured to exchange a transmission order of the retained management frame with the management frame received at the present time, and transmit the management frame received at the present time from the communicator unit corresponding to the communication controller unit.

4. The relay device according to claim 1, wherein:
in response to the management frame being retained in the transmission buffer corresponding to the communication controller unit, the communication controller unit is configured to transmit alternately the retained management frame and the management frame received at the present time from the communicator unit corresponding to the communication controller unit at regular intervals.

5. The relay device according to claim 1, wherein:
in response to the management frame being retained in the transmission buffer corresponding to the communication controller unit, the communication controller unit is configured to discard the retained management frame and transmit the management frame received at the present time from the communicator unit corresponding to the communication controller unit.

6. The relay device according to claim 2, wherein:
in response to the management frame being retained in the transmission buffer corresponding to the communication controller unit, the communication controller unit is configured to generate a new management frame by logically summing each data in the retained management frame and each data in the management frame received at the present time, and transmit the generated new management frame from the communicator unit corresponding to the communication controller unit.

7. The relay device according to claim 1, wherein:
the communication frame includes the management frame and a non-management frame different from the management frame;
the transmission buffer corresponding to the communication controller unit is provided with a first area to store the management frame and a second area to store the non-management frame independently; and
only when the management frame is retained in the first area, the communication controller unit is configured to avoid the management frame being retained, and transmit the management frame, which is received at the present time and stored in the transmission buffer, from the communicator unit corresponding to the communication controller unit.

8. A relay device connected to a plurality of networks respectively having corresponding communication buses connected to a plurality of nodes, each communication bus being connected to at least one node of the plurality of nodes, the relay device relaying a communication frame between nodes of the plurality of nodes connected to communication buses that are mutually different from each other, the communication frame including a management frame configured to manage, of a node of the plurality of nodes, (i) entry into a network of the plurality of networks, or (ii) departure from the network, or (iii) entry into and departure from the network, the relay device comprising:
a plurality of transceivers provided respectively to correspond to the communication buses, each transceiver configured to receive and transmit the management frame via the corresponding communication bus; and
a plurality of communication controllers provided respectively to correspond to the plurality of transceivers, the communication controllers configured to control communication in the corresponding transceivers,
each communication controller of the plurality of communication controllers including a corresponding transmission buffer, a transmission buffer corresponding to a first communication controller configured to store the management frame, which is received by the transceiver corresponding to a second communication controller and to be transmitted by the transceiver corresponding to the first communication controller, wherein each communication controller of the plurality of communication controllers is further configured to:

determine whether or not the transmission buffer corresponding to the communication controller retains the management frame, which is to be transmitted by the transceiver corresponding to the communication controller; and transmit the management frame, which is received at a present time and stored in the transmission buffer, from the transceiver corresponding to the communication controller while avoiding the management frame from being retained in response to determining that the transmission buffer corresponding to the communication controller retains the management frame.

\* \* \* \* \*